Patented Feb. 7, 1933

1,896,552

UNITED STATES PATENT OFFICE

RUSSELL WARD MILLAR, OF BERKELEY, CALIFORNIA, ASSIGNOR TO SHELL DEVELOPMENT COMPANY, OF SAN FRANCISCO, CALIFORNIA, A CORPORATION OF DELAWARE

PRODUCTION OF ACETYLENE

No Drawing.  Application filed March 10, 1930.  Serial No. 434,819.

My invention relates to the thermal decomposition of hydrocarbons, and consists in a new method of obtaining gaseous products of such decomposition, especially acetylene. More particularly my invention consists in the use of an inverted flame for decomposing the hydrocarbons, either liquid or gaseous.

Other features and advantages of my invention will be clear from the following description. It will be understood that the appended claims are to be accorded the scope and range of equivalents consistent with the prior art.

As generally known, acetylene and other unsaturated hydrocarbons can be obtained from saturated and unsaturated aliphatic and aromatic hydrocarbons by the application of heat. The heat is usually applied either by passing the hydrocarbons through a heated tube, or by an electric discharge within the vessel occupied by the hydrocarbons; in the case of liquid hydrocarbons the discharge takes place under the surface.

The great difficulty with these different processes is that much carbon is formed at the high temperatures necessary for the decomposition. In the case of heating tubes the deposits of carbon stop the tube; if an electric discharge is used, the deposited carbon forms a bridge between the electrodes with the result that the continuity of the discharge is broken. I have found that the formation of carbon is induced, or greatly accelerated, not so much by the high temperature as by the contact of the hot decomposing gaseous hydrocarbons and decomposition products with hot solid surfaces, such as the walls of the tubes or the hot electrodes. Also extremely violent action of the flaming electric arc or of the disruptive spark discharge, apart from their thermal effect, will cause the formation of carbon.

My invention consists in thermally decomposing the hydrocarbons while avoiding exposure to a hot solid surface, and without the use of electric discharges. I have found that this can be done with very good results by means of an inverted flame, produced by the burning of oxygen or an oxygen containing gas in an atmosphere of hydrocarbon. The acetylene immediately on being formed, passes into the surrounding oxygen free atmosphere and is conserved thereby.

In the practical application of my invention, for the decomposition of gaseous hydrocarbons I preferably cause the hydrocarbon gas to flow through a vessel, in which I burn oxygen introduced through one or more jets. In place of pure oxygen I can use air or oxygen diluted with another gas. I have found that practically no carbon is formed during decomposition in this manner. Similarly for decomposing liquid hydrocarbons as gasoline, kerosene, lubricating oils, etc., I may burn the oxygen under the surface thereof. Some carbon is formed, but this remains suspended in the liquid without interrupting the decomposition.

Various conditions affect the composition of the products obtained by the combustion according to my invention, of oxygen or dilute oxygen in gaseous hydrocarbons. The most important of these is the size and number of jets from which the oxygen burns. Experiments for the production of acetylene have shown that more acetylene is produced per unit of oxygen consumed when oxygen is burned from a jet of small diameter than when it is burned from a jet of large diameter; and more is produced when the oxygen is burned from a multiplicity of jets arranged as a group in a single vessel than from the same number of jets as individuals in separate vessels.

Further, the relative quantities of gaseous hydrocarbon and oxygen which enter the apparatus exert an enormous influence on the nature of the products of the combustion. I have found by my experiments that the percentages of acetylene and of the other gases, for example, ethylene, carbon monoxide, carbon dioxide, and hydrogen, present in the product vary continuously with the ratio of gaseous hydrocarbon to oxygen; a maximum percentage for each gas will be reached when the said ratio has a certain optimum value, different for the different gases, and varying somewhat with the size and arrangement of the apparatus, and the quantities and compositions of the gases which are introduced into it. Thus when a natural gas containing 80% methane and higher aliphatic hydrocarbons was fed into a certain apparatus together with commercially pure oxygen, the ratio of the volume of hydrocarbon to that of oxygen which gave the largest fraction of acetylene in the gaseous product at certain rates of flow of the hydrocarbon and oxygen, was 1.5; variations in the size and shape of the apparatus and in the rates of inflow caused this ratio to vary between 1.2 and 1.7. For each case the optimum conditions have to be determined by experiment according to starting material, plant and products desired. As mentioned above, the decomposition products contain many gases any one of which may be the most desirable product; the formation of each such product may be encouraged by the selection of the proper conditions of conversion. The separation of the products of decomposition can be accomplished in any well known manner.

As illustrations of my process and of the results obtained but without limiting my invention thereby, the following examples of its application may be cited:

*Example 1.*—Commercially pure oxygen was burned from a single jet of 1.5 millimeters internal diameter in a stream of natural gas containing 83% methane, 16% of higher saturated hydrocarbons, and 1% of other gases. The ratio of natural gas to oxygen was 1.57. The product contained in percent, $CO_2$, 4.3; $C_2H_2$, 4.3; $C_2H_4$, 2.3; $O_2$, 0.3; CO, 27.7; $CH_4$, 12.3; $H_2$, 47.4; and $N_2$, 1.4. Practically no carbon was deposited in the apparatus.

*Example 2.*—Commercially pure oxygen was burned from three jets, each of 1 millimeter internal diameter, in a stream of natural gas of the same composition as that in Example 1. The ratio of natural gas to oxygen was 1.50. The product contained, in percent, $CO_2$, 4.4; $C_2H_2$, 4.8; $C_2H_4$, 2.0; $O_2$, 0.5; CO, 24.7; $CH_4$, 18.0; $H_2$, 43.5; and $N_2$, 2.1. Very little carbon was deposited in the apparatus.

*Example 3.*—A mixture containing oxygen 36.4% and nitrogen 63.6% was burned from a 3 millimeter jet in a stream of natural gas. The product contained, in percent, $CO_2$, 4.6; $C_2H_2$, 2.6; $C_2H_4$, 1.0; $O_2$, 0.3; CO, 7.2; $CH_4$, 29.0; $H_2$, 8.8; and $N_2$, 46.5.

*Example 4.*—Air was burned from a 6 millimeter jet in a stream of natural gas. The product contained, in percent, $CO_2$ 5.0; $C_2H_2$ 1.9; $C_2H_4$, 0.5; $O_2$, 0.1; CO, 4.6; $CH_4$, 11.0; $H_2$, 5.7; and $N_2$, 71.2.

*Example 5.*—Commercially pure oxygen was burned from a 1.5 millimeter jet under the surface of ordinary gasoline. The flow of oxygen was 1.14 liters per minute. The gaseous product contained, in percent, $CO_2$, 7.6; $C_2H_2$, 7.9; $C_2H_4$, 6.0; $O_2$, 0.7; and CO, 33.5.

I claim as my invention:

1. A process for the decomposition of hydrocarbons, comprising: decomposing the hydrocarbons by means of an inverted flame, a portion of the hydrocarbons serving as the supporter of combustion and wherein the ratio of initial hydrocarbon to oxygen lies between about 1.2 and about 1.7 (volumetric basis).

2. A process for the decomposition of gases containing methane, comprising: decomposing said gases by means of an inverted flame, a portion of the hydrocarbons serving as the supporter of combustion, and wherein the ratio of initial hydrocarbon to oxygen lies between about 1.2 and about 1.7 (volumetric basis).

3. A process for the decomposition of hydrocarbons, comprising: decomposing the hydrocarbons by means of a plurality of inverted flames, a part of the hydrocarbon atmosphere serving as the supporter of combustion and wherein the ratio of initial hydrocarbon to oxygen lies between about 1.2 and about 1.7 (volumetric basis).

4. A process for the decomposition of hydrocarbons, comprising: decomposing liquid hydrocarbons by means of an inverted flame burning under the surface thereof, a portion of the hydrocarbons serving as the supporter of combustion.

5. A process for the decomposition of hydrocarbons, comprising: decomposing liquid gasoline by means of an inverted flame burning under the surface thereof, a portion of the gasoline serving as the supporter of combustion.

6. A process for the decomposition of hydrocarbons, comprising: cracking hydrocarbon fluid by the combustion of a gas containing a major portion of oxygen in the hydrocarbon fluid, the sole supporter of combustion constituting part of the hydrocarbon atmosphere, contact not occurring until they meet in the flame, and wherein the ratio of initial hydrocarbon to oxygen lies between about 1.2 and about 1.7 (volumetric basis).

7. A process for the decomposition of hydrocarbons, comprising: introducing an oxygen-containing gas, incapable of combustion by itself, into a hydrocarbon atmosphere wherein it is subjected to combustion with the hydrocarbon constituting said atmosphere, contact not occurring until they meet in the flame, and wherein the ratio of initial hydrocarbon to oxygen is between about 1.2 and about 1.7 (volumetric basis).

In testimony whereof, I have hereunto set my hand.

RUSSELL WARD MILLAR.